United States Patent
Mundt et al.

(10) Patent No.: US 7,482,576 B2
(45) Date of Patent: Jan. 27, 2009

(54) APPARATUSES FOR AND METHODS OF MONITORING OPTICAL RADIATION PARAMETERS FOR SUBSTRATE PROCESSING OPERATIONS

(75) Inventors: Randall S. Mundt, Pleasanton, CA (US); Andrew Beers, Liberty Hill, TX (US); Paul D. MacDonald, Tracy, CA (US); Mason L. Freed, Pleasant Hill, CA (US); Dean Hunt, Danville, CA (US)

(73) Assignee: KLA-Tencor Corporation, San Jose, CA (US)

( * ) Notice: Subject to any disclaimer, the term of this patent is extended or adjusted under 35 U.S.C. 154(b) by 201 days.

(21) Appl. No.: 11/430,315

(22) Filed: May 3, 2006

(65) Prior Publication Data

US 2006/0289763 A1    Dec. 28, 2006

Related U.S. Application Data

(60) Provisional application No. 60/677,545, filed on May 3, 2005.

(51) Int. Cl.
*G01J 5/00* (2006.01)

(52) U.S. Cl. .................... 250/239; 702/122

(58) Field of Classification Search ............... 73/865.9; 438/16; 702/184, 122; 250/239
See application file for complete search history.

(56) References Cited

U.S. PATENT DOCUMENTS

| | | | |
|---|---|---|---|
| 4,137,451 A * | 1/1979 | Einolf, Jr. ............ 250/231.13 |
| 5,444,637 A | 8/1995 | Smesny |
| 6,244,121 B1 | 6/2001 | Hunter |
| 6,417,552 B1 * | 7/2002 | Van Arendonk ............. 257/431 |
| 6,542,835 B2 | 4/2003 | Mundt |
| 6,691,068 B1 | 2/2004 | Freed et al. |
| 6,723,981 B2 * | 4/2004 | Corrado et al. ............ 250/239 |
| 6,820,028 B2 * | 11/2004 | Ye et al. .................... 702/117 |
| 6,830,650 B2 | 12/2004 | Roche et al. |
| 2002/0165678 A1 * | 11/2002 | Mundt ........................ 702/65 |
| 2004/0154417 A1 | 8/2004 | Renken et al. |
| 2004/0225462 A1 | 11/2004 | Renken et al. |
| 2005/0246127 A1 | 11/2005 | Renken et al. |

OTHER PUBLICATIONS

U.S. Appl. No. 11/179,440, filed Jul. 11, 2005, Inventors: MacDonald et al.
U.S. Appl. No. 60/722,554, filed Sep. 30, 2005, Inventors: Mundt et al.
U.S. Appl. No. 60/677,545, filed May 3, 2005, Inventors: Mundt.
U.S. Appl. No. 11/281,238, filed Nov. 16, 2005, Inventors: Mundt et al.
U.S. Appl. No. 60/285,439, filed Apr. 19, 2002, Inventors: Freed et al.

* cited by examiner

*Primary Examiner*—John R Lee
(74) *Attorney, Agent, or Firm*—Joshua D. Isenberg; JDI Patent

(57) ABSTRACT

One or more problems related to processing workpieces using processes that involve optical radiation are presented along with solutions to one or more of the problems. One embodiment of the invention comprises a sensor apparatus for collecting optical radiation data representing one or more process conditions used for processing a workpiece. In a further embodiment, the sensor apparatus is also configured for measuring data other than optical radiation.

25 Claims, 13 Drawing Sheets

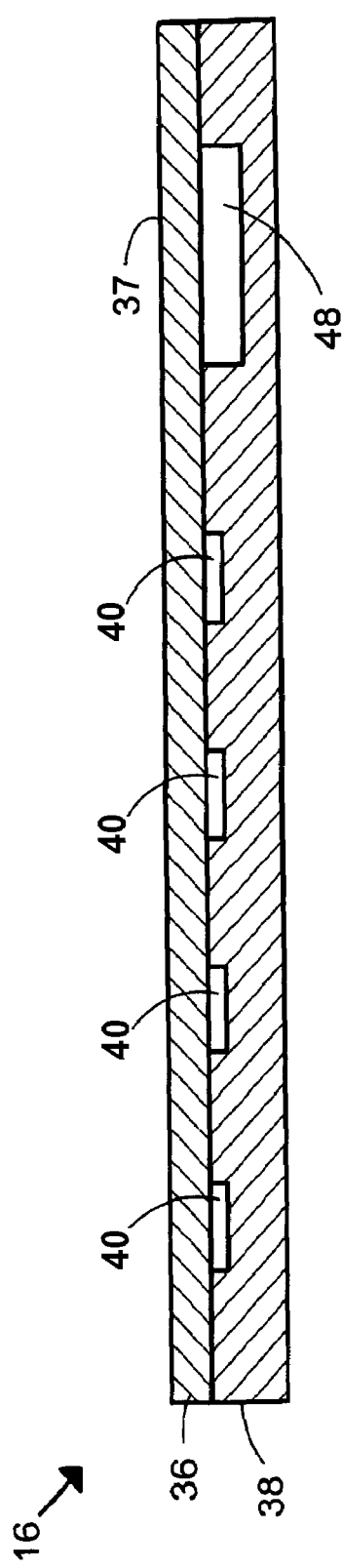
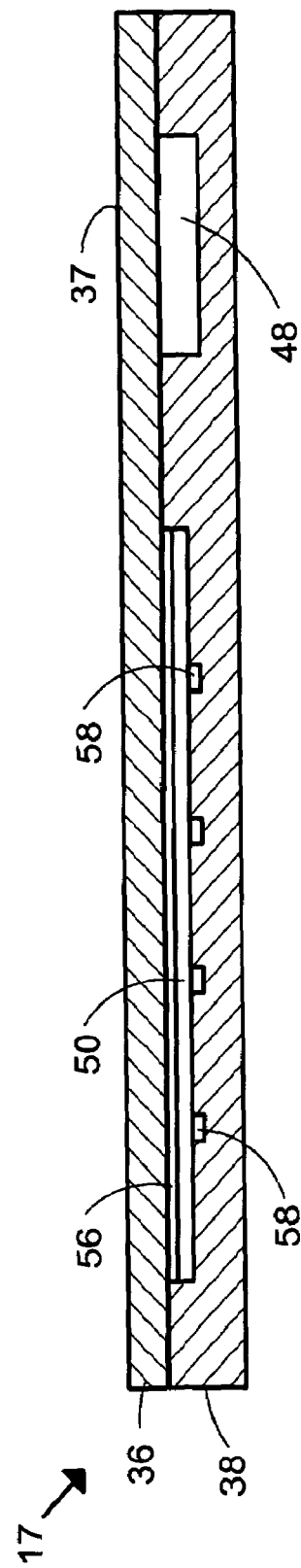

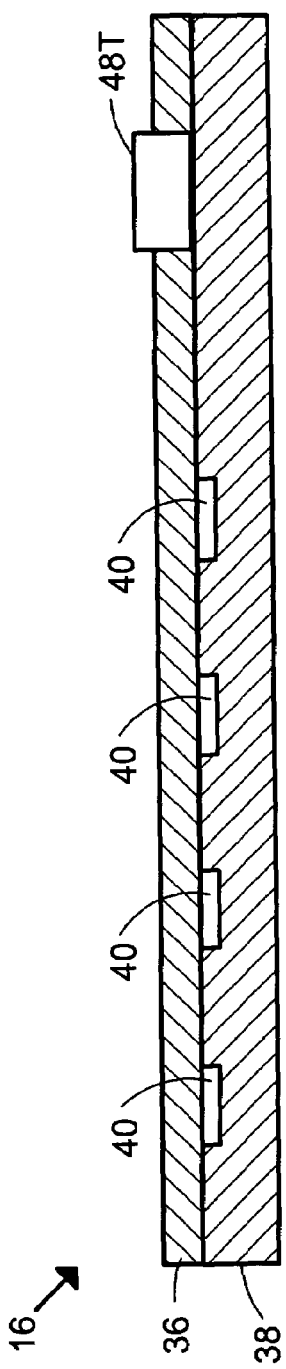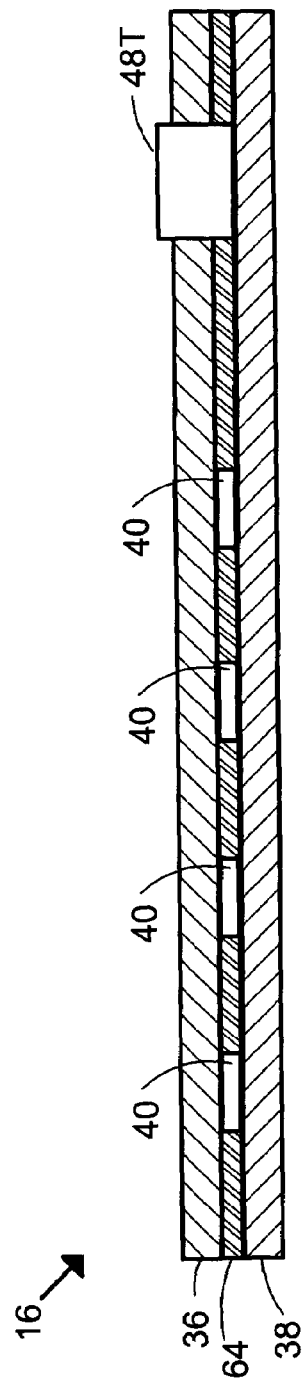
FIG. 4A
FIG. 4B

APPARATUSES FOR AND METHODS OF MONITORING OPTICAL RADIATION PARAMETERS FOR SUBSTRATE PROCESSING OPERATIONS

CROSS REFERENCES

The present application claims benefit of U.S. Patent Application Ser. No. 60/677,545, filed on 3 May 2005, inventor Randall S. MUNDT. The present application is related to U.S. Pat. No. 6,691,068, filed 22 Aug. 2000; U.S. Patent Application Ser. No. 60/530,682, filed on 17 Dec. 2003; U.S. Pat. No. 6,542,835, filed on 22 Mar. 2001; U.S. patent application Ser. No. 10/775,044, filed on 9 Feb. 2004; and U.S. Patent Application Ser. No. 60/677,545, filed on 3 May 2005. The contents of all of these applications and patents are incorporated herein, in their entirety, by this reference.

FIELD

Embodiments of the present invention generally relate to apparatuses for and methods of monitoring optical measurements such as spatially and/or temporally varying optical radiation process conditions for processing a workpiece during a manufacturing operation. More specifically, this invention relates to the measurement of optical radiation process parameter distributions and/or trajectories occurring during processes such as glow discharge processes and such as optical processes such as those used in the production of semiconductor devices, flat panel displays, and lithography masks.

BACKGROUND

Manufacturing processes such as those used for the production of electronic devices, flat panel displays, and lithography mask and processes for fabricating semiconductor devices often require that a suitable workpiece be subjected to a sequence of discrete process operations that involve optical radiation. Many of these processes are very sensitive to the process conditions and are preferably carried out within individual process chambers, often referred to as process tools, within which very specific conditions are established. Modern manufacturing facilities for such process tools typically use robotic transfer mechanisms as part of the overall automation of the production process.

The ability to establish and maintain precise conditions within the process chambers accurately and reproducibly is needed for the successful production of numerous types of products. Examples of products of particular importance are some of the state-of-the-art electronic devices such as semiconductor devices, flat panel display devices, and lithography masks. In order to achieve the high device yields and performance necessary for commercial success, the conditions within a process chamber are, in some cases, continuously monitored and controlled using sensors designed to measure specific physical parameters. Typically, these control sensors are built into the process tool so as to measure the parameter of interest such as optical radiation at a specific location within the process tool.

For applications such as the plasma processing of workpieces using a glow discharge, the techniques typically available for monitoring the plasma process conditions can suffer from a variety of problems. A typical problem is that the standard methods are intrusive in that they require modifications to the process chamber or process operating conditions. Another problem with the standard methods is that the standard methods typically provide only global measurements or averaged measurements for a region of the process. In general, currently available monitoring techniques and apparatus cannot easily provide non-intrusive, spatially and/or temporally resolved measurements of optical radiation parameters for processing a substrate. Similar problems are encountered for other types of processes such as those that directly process a workpiece using optical radiation.

Additional information about making optical measurements can be found in references such as U.S. Pat. No. 5,444,637, U.S. Pat. No. 6,244,111, U.S. Pat. No. 6,542,835, and U.S. Pat. No. 6,830,650.

Currently available optical radiation monitoring techniques and apparatus cannot easily provide non-intrusive, spatially and temporally resolved measurement of the optical radiation for such processes. Consequently, there is a need for improved methods of and apparatuses for monitoring processes that involve optical radiation. Furthermore, there is a need for methods of and apparatuses for measuring optical radiation parameters that are temporally and/or spatially resolved for processing workpieces in a process chamber.

SUMMARY

This invention seeks to provide solutions to one or more of the problems related to processing the surface of workpieces using processes that involve optical radiation. One aspect of the invention comprises a sensor apparatus for collecting data representing optical radiation process conditions used for processing a workpiece. A second aspect of the present invention is a system for monitoring and controlling the processing of workpieces for processes that involve optical radiation. A third aspect of the present invention comprises computer program products for operating and maintaining a process tool for processing workpieces using processes that involve optical radiation. A fourth aspect of the present invention comprises a method of measuring optical radiation data for processing a workpiece for which the process involves optical radiation.

It is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out aspects of the present invention. It is important, therefore, that the claims be regarded as including such equivalent constructions insofar as they do not depart from the spirit and scope of the present invention.

The above and still further features and advantages of the present invention will become apparent upon consideration of the following detailed descriptions of specific embodiments thereof, especially when taken in conjunction with the accompanying drawings.

BRIEF DESCRIPTION OF THE DRAWINGS

FIG. 2A is a cross-section side view of an embodiment of the present invention.

FIG. 3A is a cross-section side view of an embodiment of the present invention.

FIG. 4A is a cross-section side view of an embodiment of the present invention.

FIG. 4B is a cross-section side view of an embodiment of the present invention.

Figure 1:
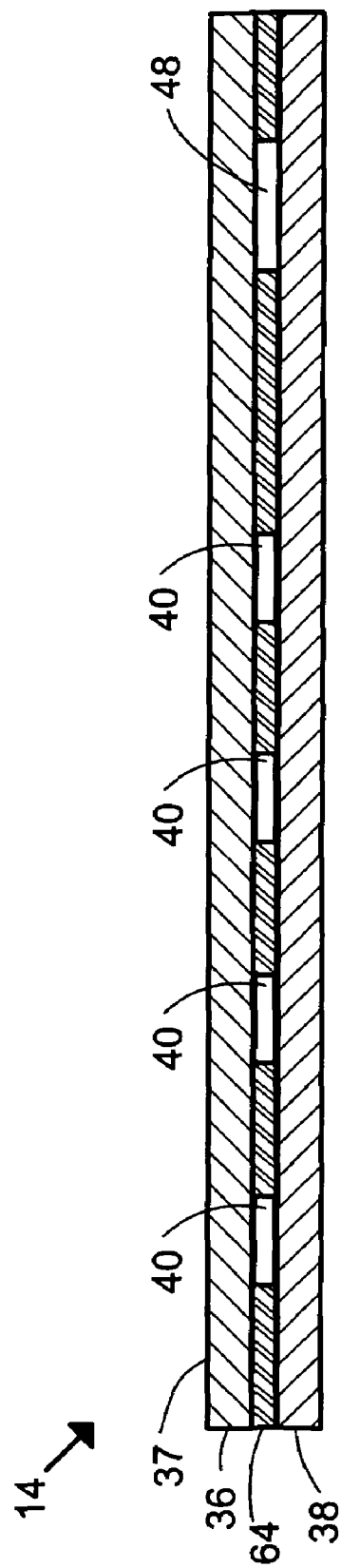
FIG. 1 is a cross-section side view of an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION

The present invention pertains to methods, apparatuses, computer program products, and systems for processing workpieces. The operation of embodiments of the present invention will be discussed below, primarily in the context of processing semiconductor wafers such as silicon wafers. Embodiments of the present invention and the operation of embodiments of the present invention will be discussed below, primarily in the context of measuring and collecting optical radiation data such as one or more of: optical radiation intensity, optical radiation distribution, optical emission, a selected spectrum of optical radiation, and optical radiation data as a function of time for processes that involve optical radiation such as processes used in processing workpieces for fabricating electronic devices. Examples of some of the processes that involve optical radiation for which embodiments of the present invention are suitable are plasma etching, glow discharge sputtering, plasma enhanced chemical vapor deposition, plasma annealing, plasma ashing, plasma stripping, photochemical deposition, photochemical etching, optical curing, optical developing, and optical annealing.

The preferred embodiments presented below describe methods, apparatuses, and systems configured so as to be capable of accurately and reproducibly measuring at least one of: (1) optical radiation distributions, (2) optical radiation distributions and optical radiation trajectories, (3) optical radiation trajectories, and (4) optical radiation spectrums for processes that involve optical radiation. A process that involves optical radiation is defined here as meaning a process for which optical radiation is used as part of performing a process or optical radiation is generated by the process. Furthermore, the optical radiation has an affect on the results of the process or the optical radiation is an indication of the status or performance of the process. However, it is to be understood that embodiments in accordance with the present invention can be used for substantially any application that involves processing a substrate using a process that involves optical radiation.

In the following description of the figures, identical reference numerals have been used when designating substantially identical elements or steps that are common to the figures.

Figure 2:
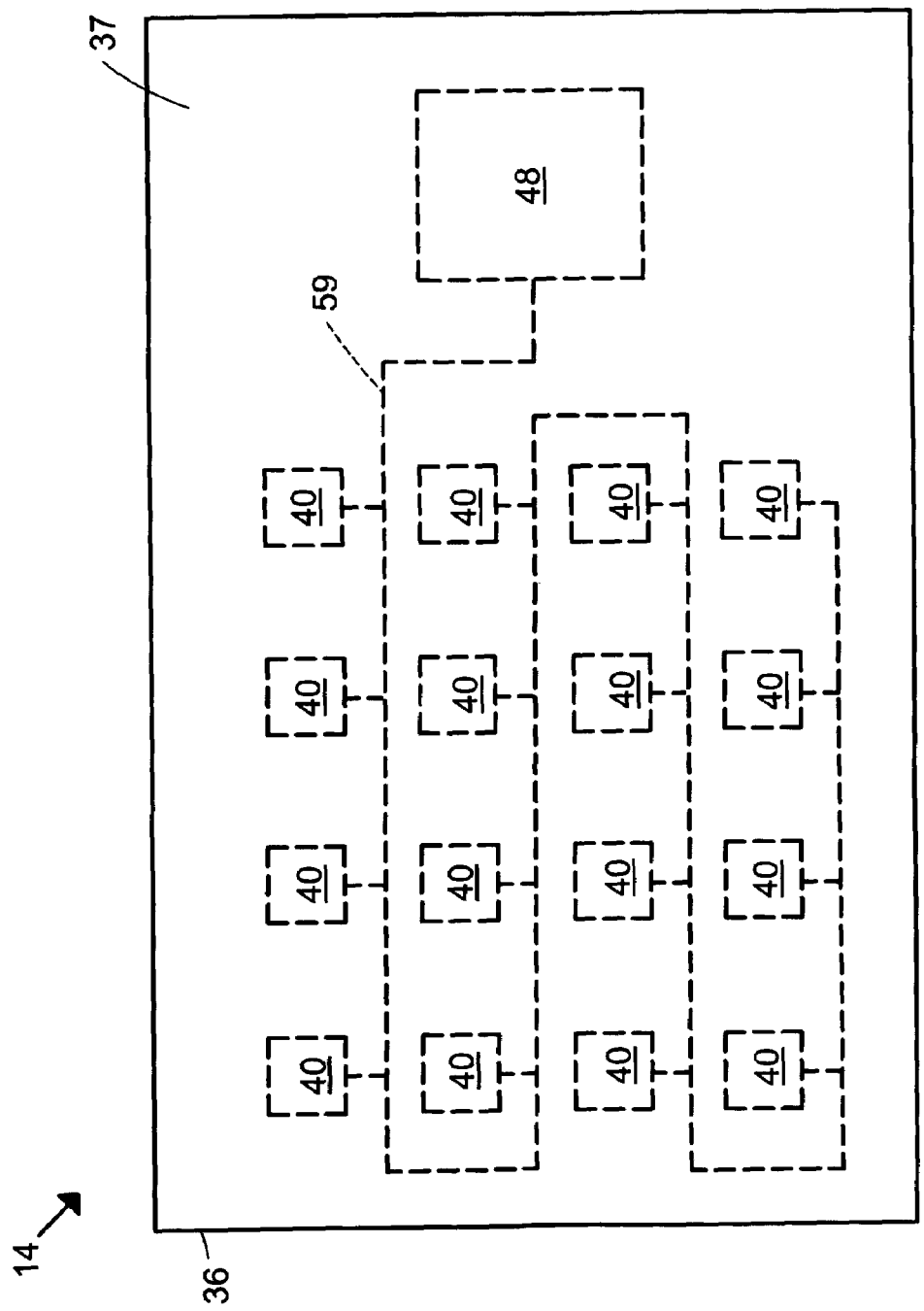
FIG. 2 is a top view of the embodiment shown in FIG. 1.

Reference is now made to FIG. 1 and FIG. 2 where there is shown a cross-section side view and a top view, respectively, of a sensor apparatus 14 according to an embodiment of the present invention. Sensor apparatus 14 is configured for measuring optical radiation distributions and/or optical radiation trajectories experienced by a workpiece during a process that involves optical radiation. Sensor apparatus 14 is shown having a window 36 with window surface 37, a base 38, sensors 40, a controller 48, and electrical conductors 59 (see FIG. 2). For the embodiment shown in FIG. 1 and FIG. 2, sensors 40, controller 48, and electrical conductors 59 are sandwiched between window 36 and base 38. More preferably, base 38 is joined with window 36 so as to substantially encapsulate sensors 40, controller 48, and electrical conductors 59 therebetween. FIG. 2 shows sensors 40, electrical conductors 59, and controller 48 using dashed lines to indicate that they are disposed behind window 36. Window 36 and base 38 are substantially parallel, in preferred embodiments.

As an option for some embodiments of the present invention, a filler material 64 may be provided so as to substantially eliminate voids between window 36 and base 38 (as shown in FIG. 1). More specifically, filler 64 can be provided to fill the voids between sensors 40, electrical conductors 59, and controller 48 that would otherwise be present between window 36 and base 38. As another option for some embodiments of the present invention, filler 64 is selected so that it also joins window 36 with base 38. In other words, filler 64 may have adhesive properties suitable for joining window 36 and base 38. Some example materials suitable for filler material 64 are well-known capillary flow underfill materials (Loctite Corp. 3593 for example), or similar low viscosity epoxy materials, or other materials.

Optionally, sensors 40 may be supported on window 36 or supported on base 38. A further use of window 36 or base 38 may be to provide support for conductors 59. In some embodiments, conductors 59 may include patterned lines of conductors fabricated from the deposition of conducting films. For example, conductors 59 may include electrical conductors fabricated using well-known electronic device metallization technologies for electrically connecting electronic devices. Still more preferably, the electrical conductors, sensors, and controller are configured so as to allow fabrication of the sensor apparatus using standard surface mounting technology for electronic devices.

Window 36 comprises a material that is substantially transparent to the optical radiation. For preferred embodiments of the present invention, window 36 is substantially transparent to optical radiation with wavelengths ranging from about 0.2 um to about 0.9 um and all wavelengths subsumed therein. Some example materials suitable for window 36 are quartz, fused silica, sapphire, diamond, aluminum oxide, or diamond-like carbon.

A plurality of sensors may be included for sensors 40 as shown in FIG. 1 and FIG. 2. Alternatively, as few as one sensor may be included in sensor apparatus 14. Preferred embodiments of the present invention include at least one optical radiation sensor. Sensors 40 are configured for measuring optical radiation. In one embodiment of the present invention, sensor 40 may be configured for measuring optical radiation power or optical radiation power density. In other embodiments of the present invention, sensor apparatus 14 may include additional sensors such as sensors other than optical radiation sensors. Examples of preferred sensors other than optical radiation sensors are sensors such as temperature sensors, charge sensors, electric field sensors, magnetic field sensors, heat flux sensors, and ion energy sensors.

A preferred embodiment of the present invention includes optical radiation sensors 40 and at least one sensor other than an optical radiation sensor. In other words, a preferred embodiment of the present invention includes different types of sensors including sensors for measuring optical radiation and one or more sensors for measuring one or more dissimilar process conditions such as temperature, charge, electric field, magnetic field, heat flux, electron energy, and ion energy. Preferably, the combination of the types of sensors incorporated into the sensor apparatus is selected so as to provide a combination of complementary measurements that can be used to obtain a more complete understanding of the process being studied. As one example, collecting temperature data in addition to optical radiation data can provide more information about the interaction of parameters and the nature of the processing conditions that the workpiece is subjected to than may be possible if only one parameter was measured or if the parameters were not measured substantially simultaneously.

Electrical conductors 59 provide electrical interconnection between sensors 40. Controller 48 is connected with electrical conductors 59 so as to allow measurement of electrical signals produced by sensors 40. Those skilled in the art are aware that there are numerous commercially available controllers that are suitable for controller 48. In addition, a variety of types of controllers are commercially available that can be used for controller 48. In one embodiment, controller 48 may include electronic devices such as microprocessors for controlling the measurement of electrical signals from conductors 59. Furthermore, controller 48 may include computer readable memory for storing data and instructions. Still further, controller 48 may be configured for transmitting data and instructions to a second location using methods such as wireless communication.

Preferably, the external surfaces of sensor apparatus 14 comprise semiconductor grade materials so that the materials are compatible with semiconductor wafer processing equipment. The measurement of optical radiation or optical radiation distributions using sensor apparatus 14 involves exposing sensor apparatus 14 to process conditions that involve optical radiation during conditions used for processing a workpiece. Spatially resolved and/or temporally resolved optical radiation through window surface 37 can be measured by sensors 40 and the measurement data are transmitted to controller 48 for one or more of processing information, storing information, and transmitting information.

Preferred embodiments of the present invention are suitable for obtaining the most useful information when the embodiment is configured to have properties similar to those of the workpiece. For the application of semiconductor wafer processing, this means that sensor apparatus 14 should have some of the important properties of the semiconductor wafers for which the process is used. Specifically, for the most preferred embodiments of the present invention, the sensor apparatus mimics the mechanical, thermal, and chemical properties of the workpiece for which the process is used.

Preferably, sensor apparatus 14 is configured so that the dimensions and shape of the sensor apparatus approximate the dimensions of the workpiece use in the process. For applications of semiconductor wafer processing, this means that sensor apparatus 14 has the shape and approximate dimensions of a semiconductor wafer. Preferably, sensor apparatus 14 is substantially circular and has a diameter approximately equal to that of the semiconductor wafer when the sensor apparatus is used for semiconductor wafer processes. In a preferred embodiment of the present invention, base 38 comprises a substantially whole semiconductor wafer such as a standard silicon wafer or other semiconductor for electronic devices fabrication.

For applications of processing flat panel displays, sensor apparatus 14 has about the same dimensions as a flat panel display substrate with the exception of a possible difference in the thickness of the sensor apparatus and the thickness of the flat panel display substrate. In preferred embodiments of the present invention for flat panel display applications, base 38 comprises a flat panel display substrate. Similarly, for applications of processing photolithography masks, sensor apparatus 14 has about the same dimensions as for a photolithography mask substrate with the possible exception that the thickness of sensor apparatus 14 may differ from that of the photolithography mask substrate. In preferred embodiments of the present invention for photolithography masks applications, base 38 comprises a photolithography mask substrate.

In preferred embodiments of the present invention for semiconductor wafer processes, sensor apparatus 14 has dimensions so that sensor apparatus 14 can be loaded and unloaded to and from the process tool in substantially the same way that the semiconductor wafer or other workpiece is loaded and unloaded. Since most modern semiconductor processing facilities and equipment use robotic systems for loading and unloading wafers, this means that sensor apparatus 14 is preferably configured so that it can be accommodated by the robotic systems used for loading and unloading semiconductor wafers for processing. In other words, preferred embodiments of the sensor apparatus are configured so as to measure optical radiation distributions and optical radiation trajectories under actual processing conditions and substantially without modifications to or perturbations of the processing equipment.

For preferred embodiments of sensor apparatus 14, window 36 comprises a material that is semiconductor grade and is compatible with processes that involve optical radiation for processing semiconductor substrates. Specifically, the physical characteristics of the substrate can be selected based on the application. For applications involving semiconductor electronic device processing, the preferred materials for constructing sensor apparatus 14 would include semiconductor materials typically used in semiconductor device processing. Similarly, for applications related to flatpanel display technology, the preferred materials would include materials typically used for manufacturing flatpanel display devices. The materials suitable for use in the fabrication of photolithography masks would be preferred materials for photolithography applications.

Applications that involve relatively small substrates such as, for example, substrates about the size of semiconductor wafers, flatpanel display substrates, and photolithography masks, the embodiment described in FIG. 1 preferably uses a controller 48 having a suitably small size. For such applications, controller 48 may include a microprocessor and sufficient accessory components for supporting the microprocessor operation for tasks such as applying electrical signals, measuring electrical signals, processing data, storing data, and transmitting information.

In preferred embodiments, sensor apparatus 14 further includes capabilities for substantially autonomous operation. One or more capabilities for autonomous operation of sensor arrays have been described in U.S. Pat. No. 6,691,068, filed 22 Aug. 2000; this application is incorporated herein, in its entirety, by this reference.

Suitable materials that can be used for sensors 40 depend upon the type of parameters to be measured and the measurement conditions. For preferred embodiments of the present invention, sensors 40 comprise a photoconductive material having electrical conductivity that is modified by exposure to radiation with wavelengths ranging from 0.2 um to 0.9 um and all wavelengths subsumed therein. Examples of the types of material that may be suitable are as follows: cadmium sulfide, cadmium selenide, selenium, germanium, silicon, amorphous silicon, cadmium telluride, silicon carbide, gallium nitride, and gallium arsenide.

For preferred embodiments of the present invention, window 36 is substantially transparent to optical radiation with wavelengths ranging from about 0.2 um to about 0.9 um and all wavelengths subsumed therein. Some example materials suitable for window 36 are quartz, fused silica, sapphire, diamond, aluminum oxide, or diamond-like carbon.

In a preferred embodiment, the electrical contacts to the sensors are further designed to allow the use of standard surface mount technology methods for connection with electrical conductors such as metallization lines and other wiring systems.

Optionally, base 38 may comprise a substantially single structure made of the material that is compatible for exposure to the process conditions in which the optical radiation measurements are to be made. Various methods can be used for fabricating base 38.

In a preferred embodiment, window 36 is configured so as to provide optical functions such as optical radiation attenuation, optical radiation wavelength transmission selectivity, and optical radiation reflectivity reduction. Alternatively, window 36 may be configured so as to act as interference filters or used to support interference filters to provide the optical functions. As an option for preferred embodiments, optical functions such as optical radiation attenuation, optical radiation wavelength transmission selectivity, and optical radiation reflectivity reduction can be achieved by depositing thin optical films onto window 36 for attenuation, transmission selectivity, and reflectivity control. For some embodiments of the present invention, the sensor apparatus also includes a thin film optical interference filter applied to window 36 (interference filter not shown in FIG. 1 or FIG. 2).

As an option for some embodiments of the present invention, the sensor apparatus includes wavelength specific filters configured to operate with sensors 40 so as to provide information that is more specifically related to the distributions of selected chemicals involved in the production of the optical radiation being measured during the process (wavelength specific filters not shown in FIG. 1 or FIG. 2).

In another preferred embodiment, the sensor apparatus also includes a temperature sensor such as a thermistor and/or a blind photo sensor that may be used for temperature compensation of the illumination reading. In other words, the embodiment includes a photosensor structure that is not exposed to the optical radiation so as to serve as a reference for the readings obtained for the photosensors that are exposed to the optical radiation. Alternatively, another type of temperature sensor can be incorporated as part of the sensor apparatus.

Controller 48 is configured for receiving information and, in preferred embodiments, also processing information, storing information, transmitting information, and executing computer commands. Preferably, controller 48 includes an information processor for executing commands and processing data from the sensors. Some examples of suitable information processors are information processors such as a microprocessor, an application-specific integrated circuit, and a computer. Controller 48 further includes additional supporting devices to allow the information processor to function. Some of the additional supporting devices include a power source such as a battery, a transmitter, and/or a receiver, and an information storage device such as a memory. In preferred embodiments of the present invention, controller 48 is configured for wireless information transfer. A detailed description of suitable electronic components and configurations for the electronic components for embodiments of the present invention can be found in U.S. Pat. No. 6,691,068 and U.S. Pat. No. 6,542,835.

Figure 3:
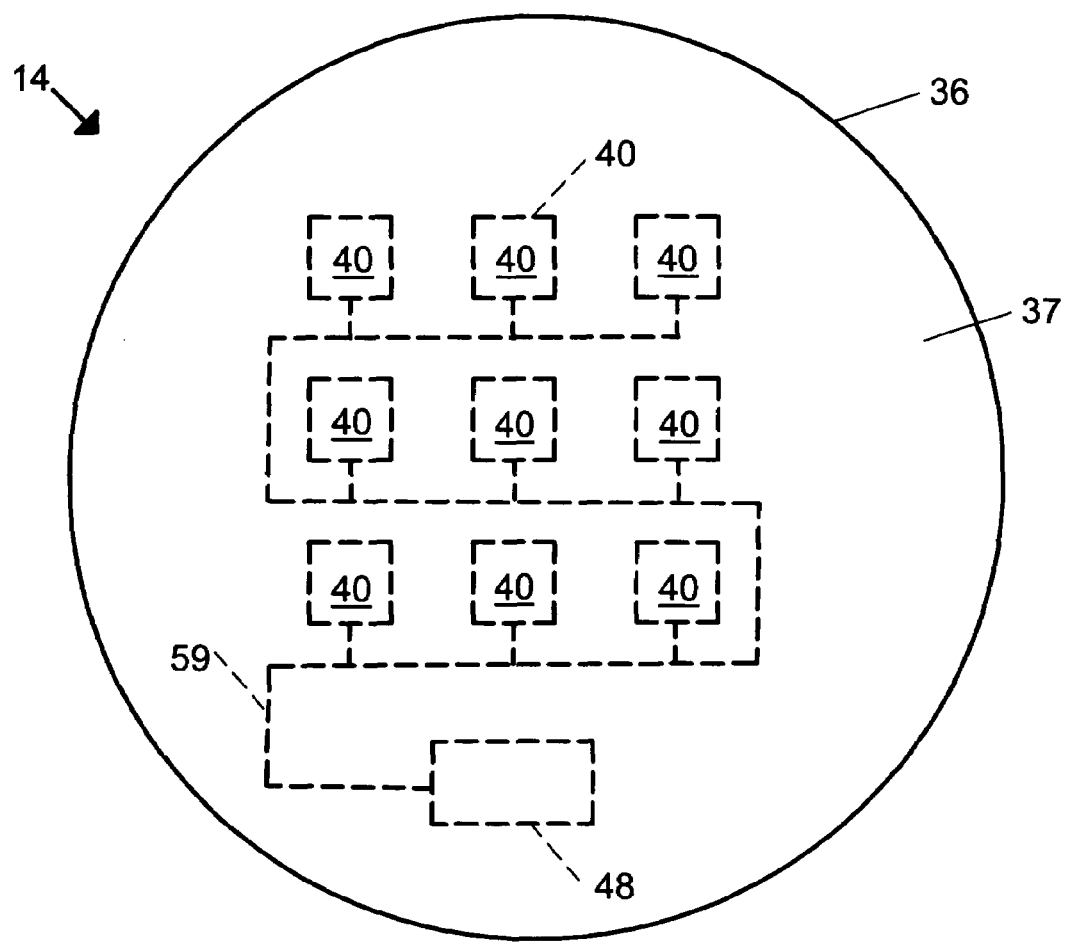
FIG. 3 is an alternative top view of the embodiment shown in FIG. 1.

Reference is now made to FIG. 3 where there is shown a sensor apparatus 14. Sensor apparatus 14 shown in FIG. 3 is substantially the same as sensor apparatus 14 shown in FIG. 2 with the exception that window 36 and base 38 are configured in a circular form rather than the rectangular form shown in FIG. 2. The circular form would be preferred for applications in a processing tool for processing circular substrates such as circular semiconductor wafers. A rectangular or a square form for sensor apparatus 14 would be preferred for applications such as those for processing rectangular or square substrates such as substrate used for fabricating flat panel displays and substrates used for fabricating lithography masks.

Embodiments of the present invention such as those described in FIG. 1, FIG. 2, and FIG. 3, as an option, can use standard metal interconnect or wiring technology. Alternatively, other embodiments of the present invention may use electrical conductors configured as a cross point network connecting the sensors and the controller. The use of a crosspoint network in embodiments of the present invention provide additional configurations and can incorporate additional functions in the embodiment that may not be possible using standard interconnect technology that does not use a crosspoint network.

A preferred embodiment of the present invention uses a crosspoint network for which the operation includes activating multiple sensors by applying electrical signals to the sensors simultaneously and making measurements for each activation state. In this embodiment, the sensors are configured as crosspoint nodes for the network. For example, if the activation involves a current, then current flows through all sensors every measurement. The value at each sensor is then mathematically extracted from the set of measurement data. No single measurement contains data from only one sensor; each measurement has a mixture of data from each sensor.

The crosspoint network for some embodiments of the present invention may include at least one input electrical conductor, at least two output electrical conductors, and at least two sensors. The conductance characteristics (current voltage behavior) of the sensors are a function of optical radiation exposure which is to be measured. The electrical conductors and sensors are arranged to form a crosspoint array wherein the rows (horizontal conductors) are formed by the input electrical conductors, the columns (vertical conductors) are formed by the output electrical conductors, and the sensors are connected between the output electrical conductors and the input electrical conductors at each crossing point (nodes).

Figure 1A:
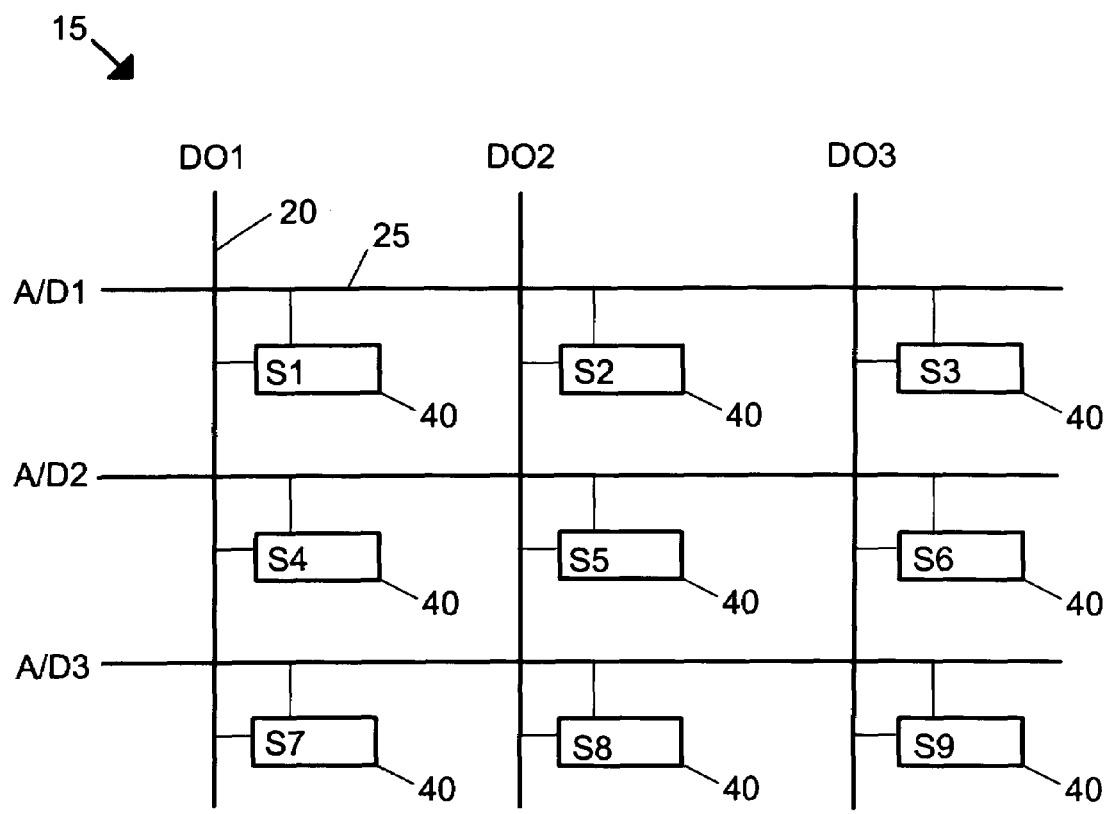
FIG. 1A is a diagram of a network for a sensor array for an embodiment of the present invention.

To better illustrate embodiments of the present invention that include a crosspoint network for a sensor array, reference is now made to FIG. 1A where there is shown a diagram of a network for a sensor array 15 according to an embodiment of the present invention. Sensor array 15 includes three output electrical conductors 20, three input electrical conductors 25, and sensors 40. The embodiment shown in FIG. 1A is configured so nine sensors are included in sensors 40. Each of the sensors 40 are connected with one of the output electrical conductors 20 so that sensors 40 can receive electrical signals via output electrical conductors 20. In addition, each of the sensors 40 is connected with one of the input electrical conductors 25 so that sensors 40 can send electrical signals via input electrical conductors 25. This arrangement results in a network where sensors 40 serve as crosspoint connections between output electrical conductors 20 and input electrical conductors 25 so as to form a crosspoint network.

A variety of electrically conductive materials and material configurations are suitable for use in output electrical conductors 20 and input electrical conductors 25. For example, conductors 20 and conductors 25 may comprise conducting wires such as fine gauge wires; alternatively, the electrical conductors may be formed by thin film techniques such as those for metallization lines in electronic devices. In preferred embodiments, the electrical conductors are formed by thin film techniques.

With the sensors shown in FIG. 1A being photoresistors, an embodiment of a suitable method for using sensor array 15 may include the following steps. Electrical signals such as, for example, a pattern of high and low voltages, are applied to output conductors 20, labeled DO lines. In preferred embodiments, there are at least one high output voltage and at least one low output voltage. Preferably, output conductors 20, the DO lines, have significantly lower impedance than sensors 40; this is assumed to be true for this example embodiment. An example pattern of high and low voltages for the embodiment shown in FIG. 1A may include a high voltage, Vhigh, on output conductor 20 indicated as DO1 and low voltages, Vlow, on output conductors 20 indicated as DO2 and DO3.

Additional examples of patterns of high and low voltages that can be used to obtain sets of measurements are: all voltages low except one, i.e., LLLLLHLLLLLL; every other voltage high, i.e., LHLHLHLHLHLH; all voltages high except one, i.e., HHHHHHLHHHHH; and any other combination of voltages where at least one line is at high voltage and at least one line is at low voltage. Preferred patterns will depend upon the characteristics of the sensors at the nodes.

Voltage measurements are made on input electrical conductors 25, labeled A/D1 through A/D3. Preferably, the voltage measurement hardware has significantly higher impedance than the sensors; this is assumed to be true for this example embodiment.

The voltage appearing at input electrical conductor 25, labeled A/D1, will thus be determined by the resistive voltage divider formed by the resistance of sensors 40, labeled S1, in series with the parallel combination of the resistances of sensors 40, labeled S2 and S3. Consequently, the equation for the voltage V(A/D1) at input electrical conductor 25 labeled A/D1 is given by the equation $$V(A/D1)=Vlow+(Vhigh-Vlow)*(S2*S3)/(S2+S3)/(S1+(S2*S3)/(S2+S3))$$

where in this equation:
S represents resistance,
Resistance of S2 and S3 in parallel=(S2*S3)/(S2+S3),
Total resistance=(S1+(S2*S3)/(S2+S3)).

In a similar manner, the voltages appearing at input electrical conductors 25, labeled A/D2 and A/D3, are functions of sensors 40, S4 through S9. As various patterns of Vhigh and (low are applied to output electrical conductors 20, similar relationships between the voltages measured at input electrical conductors 25 and resistance information for sensors 40 can be derived. Specifically, well-known linear algebra techniques and the set of measurements can be used to obtain ratios that equal the resistance values for each sensor of sensors 40 directly connected to the same input electrical conductor 25. In other words, the ratios indicate changes in the measurements provided by the sensors. Spatially resolved parameter maps and temporally resolved parameter maps can be obtained showing the relative changes in the parameter measurements for each sensor.

An essential characteristic of some embodiments of the present invention is the proper selection of the resistance of the sensors. More specifically, for applications of measuring optical radiation according to embodiments of the present invention, the crosspoint network described here must be used with sensors having resistance properties that have been optimized for use with the crosspoint network. As a result of properly selecting the resistance properties for the sensors, it is possible to more easily collect the optical radiation measurements and to process the optical radiation measurements with the information processing devices described herein.

In other words, the sensor apparatus comprises symmetrically resistive elements, shown in FIG. 1A as sensors 40, having a base resistance and sensitivity optimized for use with the crosspoint network measurement techniques and algorithms described supra. In a preferred embodiment of the present invention, the resistance properties for sensors 40 are optimized for making optical radiation measurements using the crosspoint network. Preferably, sensors 40 are designed to have a dark resistance of no more than about 2 mega-ohms and a fully illuminated resistance of no less than 10,000 ohm. More preferably, sensors 40 are designed to have a dark resistance of no more than about 0.5 mega-ohms and a fully illuminated resistance of no less than about 30,000 ohm.

One embodiment of the present invention uses approximately 3 volts as a high voltage and near 0 volts, such as at about ground, as a low voltage. For accurate parameter measurements, it is preferable to be able to measure with reasonable accuracy the values of voltages between the high and low points. The specific selection of a high and low is usually set by factors such as what voltages are available, what voltages the sensors require for operation, and the preferred voltage range for analog to digital conversion.

In another embodiment of the present invention, the information for each sensor can be obtained directly. In other words, the impedance value for each sensor can be determined rather than obtaining ratios of impedances. This means that the impedances can be converted to indicate values for the parameter being measured. The capability of obtaining impedance values for each sensor is the result of hardware modifications to the sensor array. For illustration, reference is now made to FIG. 1B wherein there is shown a network for a sensor array 15 having output electrical conductors 20, input electrical conductors 25, and sensors 40. Output electrical conductors 20, input electrical conductors 25, and sensors 40 are all essentially the same as those described for the embodiment illustrated in FIG. 1A with the exception that there are six sensors 40 and added to the network are three reference elements 41 labeled as R1, R2, and R3 in FIG. 1B. Reference elements 41 are connected to output electrical conductors 20 and input electrical conductors 25 to form crosspoint connections therebetween. In other words, reference elements 41 form crosspoint connections in essentially the same way that sensors 40 form crosspoint connections between output electrical conductors 20 and input electrical conductors 25. Preferably, reference elements 41 populate each crossing point along one of the output conductor lines 20.

Reference elements 41 have predetermined impedances. Preferably, the predetermined impedances result from reference elements 41 having a substantially constant impedance with respect to the parameter being measured. The predetermined impedances of reference elements 41 can be incorporated into the equations used for deriving the measurement parameters for each of the sensors. The number of unknowns is reduced as a result of including information for reference elements 41. This permits calculation of information for each of the sensors as ratios of the sensor impedances to the reference element impedances. The impedances for the reference elements are predetermined, thus, allowing the impedances of the sensors to be determined using the ratios.

Including reference elements with predetermined resistance values in the example given earlier where the sensors are photoresistors creates a special case for the calculations. In this special case, the ratio of the sensor resistance to the reference resistance is identical to the ratio of the measured voltages. The resistance values for each of the sensors can be obtained using the voltage ratios and the predetermined resistances for the reference elements. The following illustrative example provides more details and example equations.

Figure 1B:
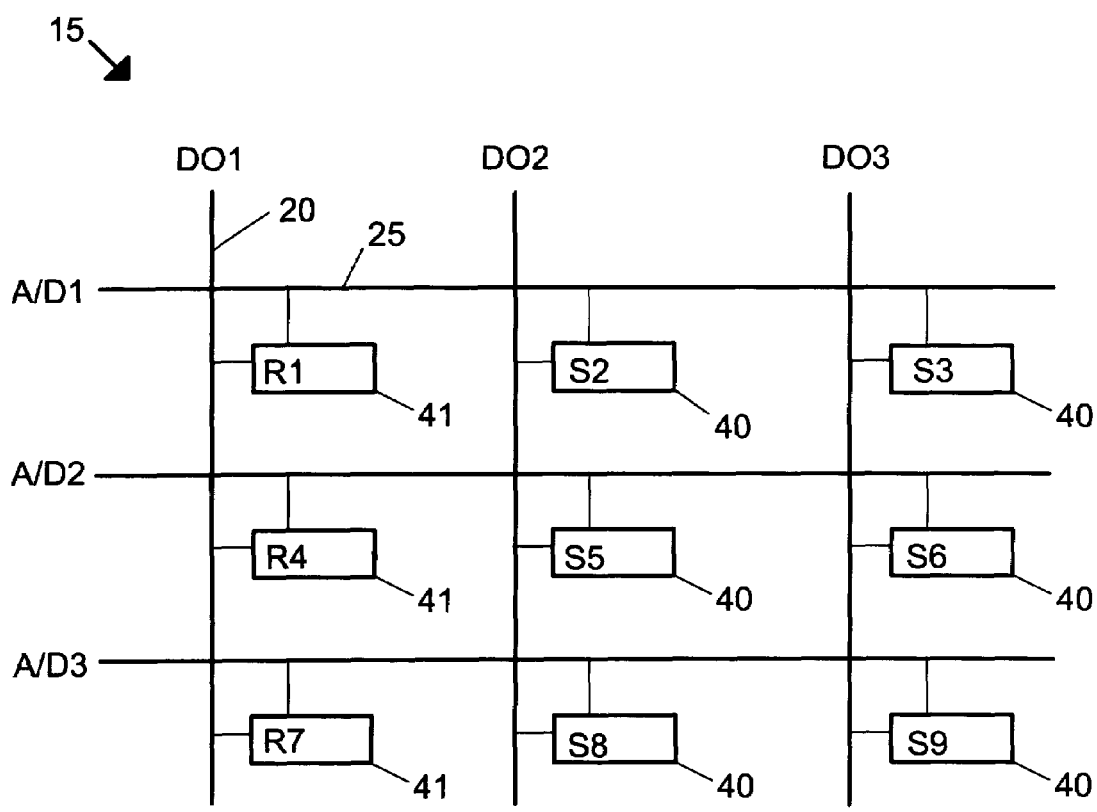
FIG. 1B is a diagram of a network for a sensor array for an embodiment of the present invention.

Referencing FIG. 1B, if one of the output electrical conductors 20 is brought to high voltage, Vhigh, and the other output electrical conductors 20 are held to about electrical ground, an equivalent circuit can be used to describe the electrical characteristics of each input electrical conductor 25. In an example set of measurements, a pattern of electrical signals brings each of the output electrical conductors 20 to Vhigh once, and the resultant voltage at input electrical conductors 25 are recorded. The voltage developed at input electrical conductors 25 when reference elements 41 are brought to Vhigh is given by the following equation:

$$V_s = \frac{\frac{R_p R_r}{R_p + R_r}}{\frac{R_p R_r}{R_p + R_r}} Vhigh = \frac{R_p R_r}{R_p R_r + R_s(R_p + R_r)} Vhigh$$

where:
  $R_r$ is resistance of the reference element,
  $R_s$ is resistance of a single sensor, and
  $R_p$ is parallel resistance of the other sensors.

Similarly, the equation that gives the analog voltage for the case when the sensor is brought to Vhigh is:

$$V_r = \frac{R_p R_s}{R_p R_s + R_r(R_p + R_s)} V_{dd}$$

Dividing these two equations results in the following relation:

$$\frac{V_r}{V_s} = \frac{\frac{R_p R_s}{R_p R_s + R_r(R_p + R_s)} V_{dd}}{\frac{R_p R_r}{R_p R_r + R_s(R_p + R_r)} V_{dd}} = \frac{\frac{R_p R_s}{R_p R_s + R_r R_p + R_r R_s}}{\frac{R_p R_r}{R_p R_r + R_s R_p + R_s R_r}} = \frac{R_s}{R_r}$$

Therefore, by finding the ratio of the voltages for the two experiments, and using the known resistance of the reference element, the unknown sensor resistance can be computed.

Figure 2B:
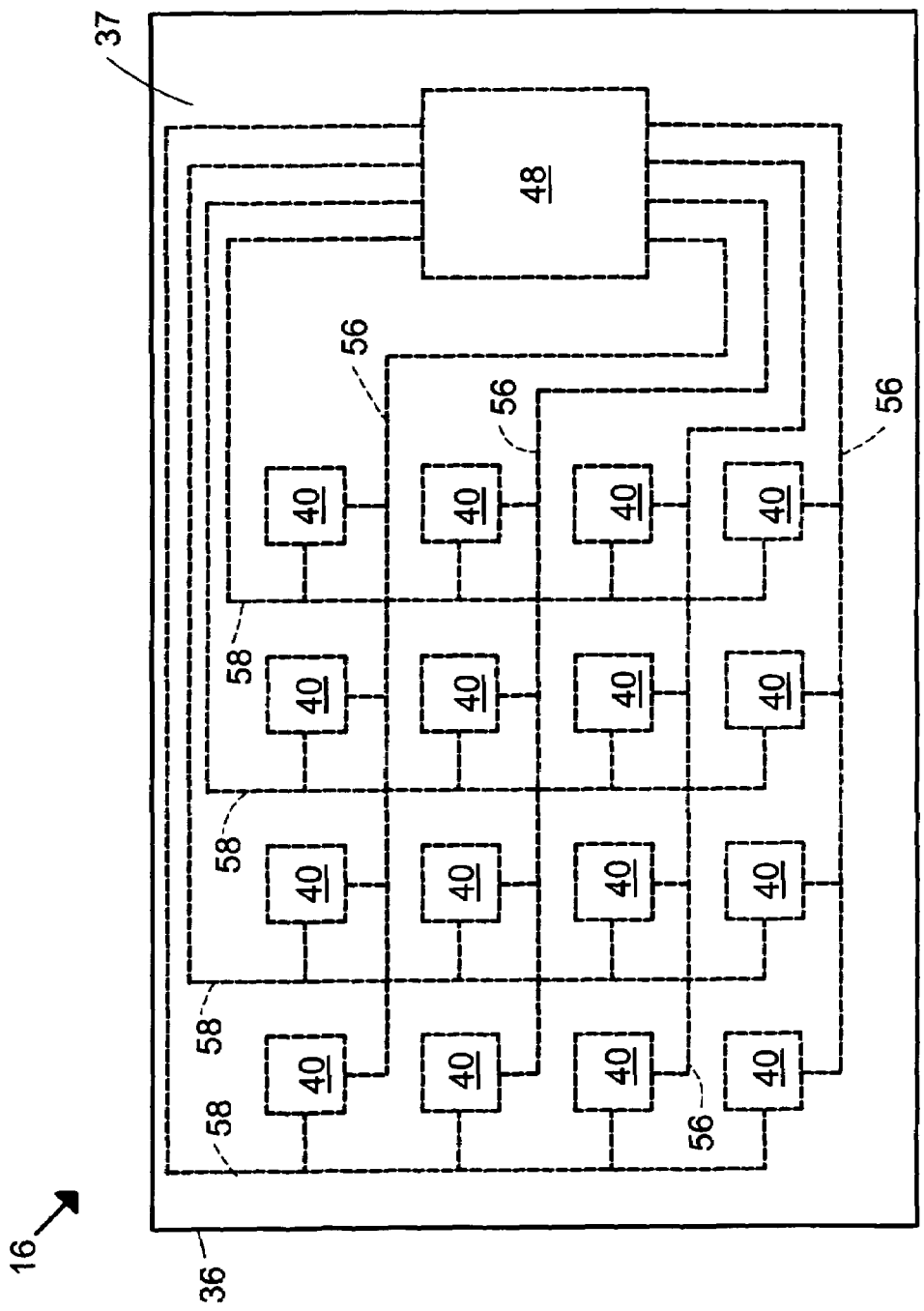
FIG. 2B is a top view of the embodiment shown in FIG. 2A.

Reference is now made to FIG. 2A and FIG. 2B where there is shown a cross-section side view and a top view, respectively, of a sensor apparatus 16 according to an embodiment of the present invention. Sensor apparatus 16 is configured for measuring optical radiation distributions and/or trajectories experienced by a workpiece during a process that involves optical radiation. Sensor apparatus 16 is shown having output electrical conductors 56, input electrical conductors 58, and sensors 40. Conductors 56, conductors 58, and sensors 40 are essentially the same as those described for the embodiments shown in FIG. 1A and FIG. 1B.

Sensors 40 are configured for measuring optical radiation. In one embodiment of the present invention, sensors 40 may be configured for measuring optical radiation power or optical radiation power density. In other embodiments of the present invention, sensor apparatus 16 may include other sensors such as sensors other than optical radiation sensors; examples of preferred sensors other than optical radiation sensors are sensors such as temperature sensors, charges sensors, electric field sensors, magnetic field sensors, electron energy, and ion energy. A preferred embodiment of the present invention includes optical radiation sensors 40 and at least one sensor other than an optical radiation sensor such as a temperature sensor. In other words, a preferred embodiment of the present intention includes different types of sensors including sensors for measuring optical radiation and one or more sensors for measuring one or more dissimilar process conditions such as temperature along with the measurement of optical radiation.

Sensor apparatus 16 further includes a controller 48. Controller 48 is connected with output electrical conductors 56. Controller 48 is capable of applying electrical signals to sensors 40 via output electrical conductors 56. Controller 48 is also connected with input electrical conductors 58 so that controller 48 can measure electrical signals from sensors 40 via input electrical conductors 58. In other words, controller 48 is capable of measuring electrical signals and applying electrical signals.

Those skilled in the art are aware that there are numerous commercially available controllers that are suitable for controller 48. In addition, a variety of types of controllers are commercially available that can be used for controller 48. In one embodiment, controller 48 may include electronic devices such as microprocessors for controlling the measurement of electrical signals from input conductors 58 and for controlling the application of electrical signals to output conductors 56. Furthermore, controller 48 may include computer readable memory for storing data and instructions. Still further, controller 48 may be capable of transmitting data and instructions to a second location such as by using wireless communication methods.

In another embodiment, controller 48 includes two separate but coordinated control systems. One control system generates the pattern of electrical outputs to the sensors, and the other control system measures the electrical signals from the sensors.

Sensor apparatus 16 also includes a substantially planar optically transparent window 36 having a window surface 37. Sensor apparatus 16 also includes a base 38 joined with window 36 so as to substantially encapsulate sensors 40, conductors 56, and conductors 58 therebetween. Window 36 and base 38 are substantially parallel for preferred embodiments. Optionally, sensors 40 may be supported on window 36 or supported on base 38. A further use of window 36 or base 38 may be to provide support for conductors 56 and conductors 58. In some embodiments, conductors 56 and conductors 58 may include patterned lines of conductors fabricated from the deposition of conducting films. For example, conductors 56 and conductors 58 may include electrical conductors fabricated using well-known electronic device metallization technologies for electrically connecting electronic devices. Still more preferably, the metallization lines, sensors, and controller can allow fabrication of the sensor apparatus using standard surface mounting technology for electronic devices.

In addition to reducing the complexity of the electrical wiring, embodiments according to the present invention also require fewer electrical ports than are required for some of the standard methods for parameter mapping. Using embodiments of the present invention, the number of electrical ports required for sending electrical signals to the sensors and receiving electrical signals from the sensors equals the sum of the number of input electrical conductors and the number of output electrical conductors.

Specifically, for each of the output electrical conductors the controller may preferably have one electrical port for sending electrical signals to the sensors. Similarly, for each input electrical conductor the controller may preferably have one electrical port for measuring the electrical signal. Consequently, embodiments of the present invention may include 100 sensors and require only 20 electrical ports for sending and receiving electrical signals. For comparison, some of the standard mapping technologies requires 200 electrical ports. In other words, embodiments of the present invention can reduce the number of required electrical ports by a factor of up to 10 or greater when compared to the requirements for some of the standard technologies.

As stated earlier, suitable controllers for embodiments of the present invention may include one or more microprocessors. Many of today's commercially available microprocessors may have 4, 8, or 16 signal output ports and 4, 8, or 16 signal input ports. For a typical integrated microprocessor with 8 analog inputs and 8 digital outputs, a sensor array having 64 sensors can be control; this is a configuration for a preferred embodiment of the present invention. This means that it may be possible to obtain a total of 64 measurements substantially simultaneously.

FIG. 2B shows a top view of sensor apparatus 16. Window 36 is shown with window surface 37 facing up. Beneath window 36 are shown output electrical conductors 56, input electrical conductors 58, sensors 40, and controller 48; they are all drawn in dashed lines so as to indicate they are equivalent to being hidden although window 36 is at least partially transparent. Conductors 56, conductors 58, sensors 40, and window 36 are essentially the same as those described for the embodiment shown in FIG. 2A. Optionally, some of the sensors 40 can be replaced with reference elements so as to obtain exact values of resistance for each of the sensors that was described supra for sensor array 15.

Figure 2C:
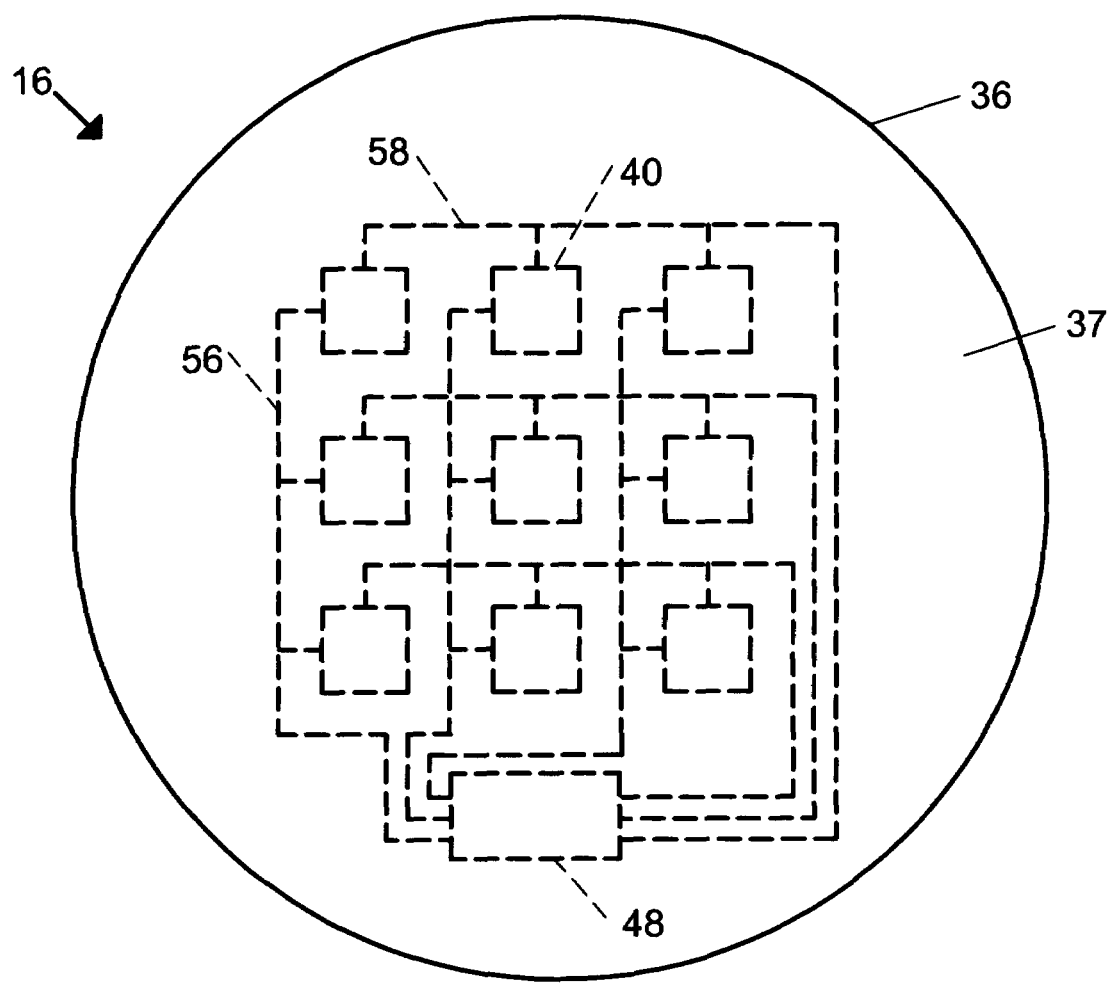
FIG. 2C is an alternative top view of the embodiment shown in FIG. 2A.

Reference is now made to FIG. 2C where there is shown a sensor apparatus 16. Sensor apparatus 16 shown in FIG. 2C is substantially the same as sensor apparatus 16 shown in FIG. 2B with the exception that window 36 and base 38 are configured in a circular form rather than the rectangular form shown in FIG. 2B.

Applications for the embodiments shown in FIG. 2A, FIG. 2B, and FIG. 2C that involve relatively small substrates such as, for example, substrates about the size of semiconductor wafers, flatpanel display substrates, and photolithography mask preferably use controller 48 having a suitably small size. For such applications, controller 48 may include a microprocessor and sufficient accessory components for supporting the microprocessor operation for task such as applying electrical signals, measuring electrical signals, processing data, storing data, and transmitting information.

Figure 3B:
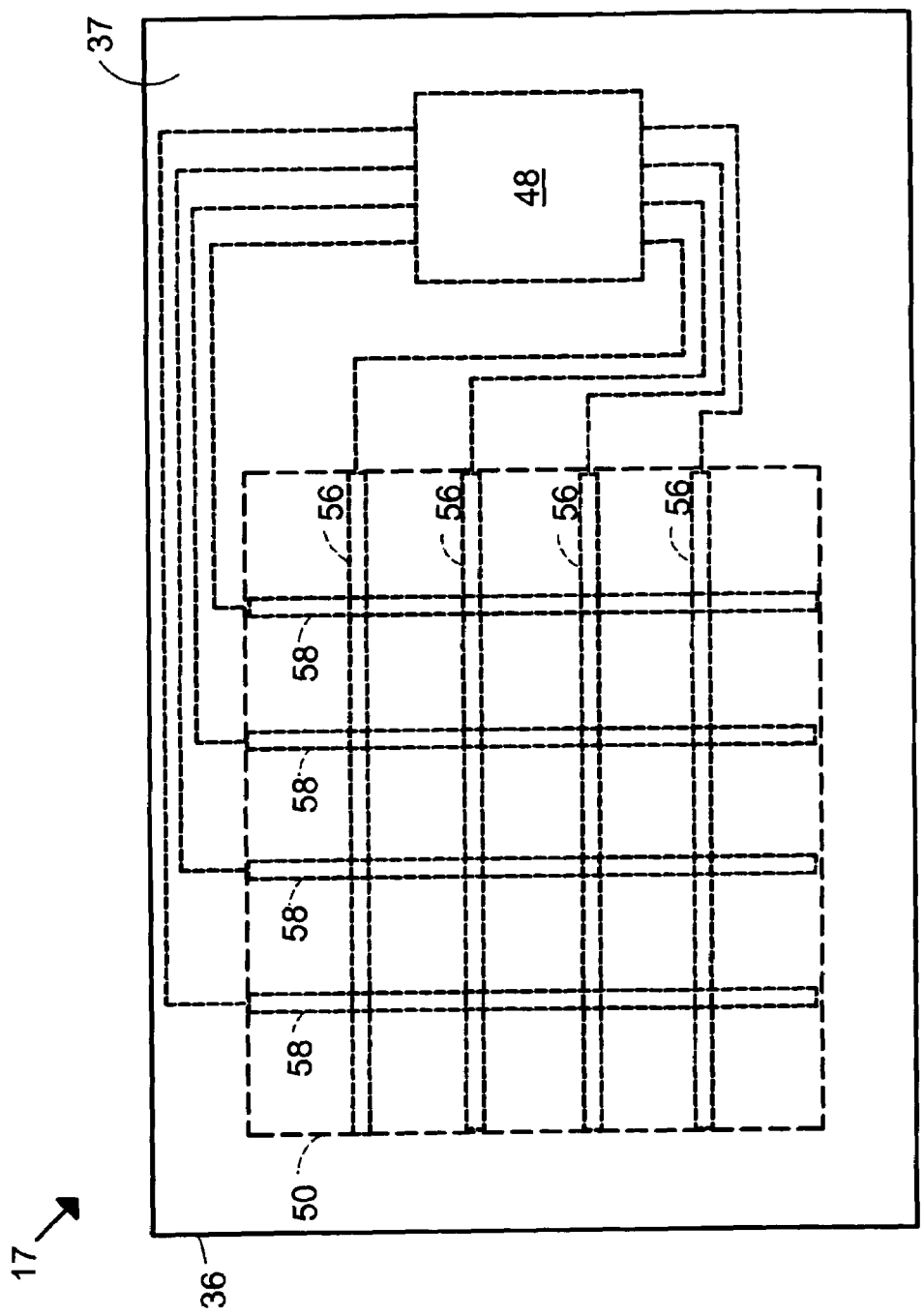
FIG. 3B is a top view of the embodiment shown in FIG. 3A.

Reference is now made to FIG. 3A and FIG. 3B where there are shown a cross-sectional side view and a top view, respectively, of a sensor apparatus 17 according to an embodiment of the present invention. Sensor apparatus 17 includes a window 36, a base 38, a controller 48, an optical radiation sensing sheet 50, output electrical conductors 56, and input electrical conductors 58. Window 36, base 38, and controller 48 are essentially the same as those described for the embodiment presented in FIG. 2A. For the embodiment shown in FIG. 3A, conductors 56 and conductors 58 are arranged so that they are substantially perpendicular. Conductors 56 are configured so as to form an ohmic contact with sheet 50 on one side of sheet 50; conductors 58 are configured so as to form an ohmic contact with sheet 50 on the opposite side of sheet 50. Optical radiation sensing sheet 50 is sandwiched between conductors 56 and conductors 58 so that optical radiation sensing sheet 50 contacts conductors 56 and conductors 58 so that optical radiation sensing sheet 50 forms crosspoint connections between conductors 56 and conductors 58 at one or more crossing points for conductors 56 and conductors 58. Window 36 and base 38 are joined so as to substantially encapsulate sheet 50, conductors 56, and conductors 58 in a sandwich structure so that optical radiation passing through window 36 strikes at least a portion of sheet 50. Conductors 56 and conductors 58 are connected with controller 48 so that controller 48 can apply electrical signals and measure electrical signals for the conductors. Optionally, controller 48 maybe enclosed between window 36 and base 38 as shown in FIG. 3A.

In some embodiments, optical radiation sensing sheet 50 may be substantially continuous between two or more crosspoint connections. The sensors for sensor apparatus 17 comprise the crosspoint connections formed by sheet 50 across conductors 56 and conductors 58. The apparent locations of sensors are defined by the locations of the contacts to conductors 56 and conductors 58. In preferred embodiments, sheet 50 comprises a substantially continuous, substantially uniform layer of a photoconductive material suitable for sensing optical radiation so that two or more individual sensors are substantially not electrically isolated from each other.

Suitable materials that can be used for optical radiation sensing sheet 50 depend upon the type of parameters to be measured and the measurement conditions. For preferred embodiments of the present invention sheet 50 comprises a photoconductive material having electrical conductivity that is modified by exposure to radiation with wavelengths ranging from 0.2 um to 0.9 um. Examples of the types of material that may be suitable for sheet 50 are as follows: cadmium sulfide, cadmium selenide, selenium, germanium, silicon, amorphous silicon, cadmium telluride, gallium nitride, and gallium arsenide.

A characteristic of some embodiments of the present invention is the proper selection of the resistance of the crosspoint connections formed by conductors 56, conductors 58, and sheet 50. More specifically for applications of measuring optical radiation according to embodiments of the present invention, the crosspoint network described preferably uses sheet 50 having resistance properties that have been optimized for used with the crosspoint network. As a result of properly selecting the resistance properties for sheet 50, it is possible to more easily collect the optical radiation measurements and to process the optical radiation measurements with the information processing devices described herein.

In other words, sensor apparatus 17 comprises symmetrically resistive elements defined by the crosspoint connections formed by conductors 56, conductors 58, and sheet 50. The crosspoint connections are configured so as to have a base resistance and sensitivity optimized for use with the crosspoint network measurement techniques and algorithms described supra. Preferably, the crosspoint connections are designed to have a dark resistance of no more than about 2 mega-ohms and a fully illuminated resistance of no less than about 10,000 ohms. More preferably, the crosspoint connections are designed to have a dark resistance of no more than about 0.5 mega-ohms and a fully illuminated resistance of no less than about 30,000 ohms.

The mathematical algorithms used to extract an individual sensor measurement from the matrix of measurements are dependent upon the sensor characteristics. It will be obvious to one of ordinary skill in the art that a variety of sensor arrangements and structures can be used in practicing aspects of the present invention.

Another embodiment of the present invention includes sensors having nonlinear impedance characteristics such as semiconductor junctions and/or inversion/depletion layers. Analysis of the data obtained from nonlinear electrical impedance functionality can be achieved using well-known iterative, nonlinear fitting algorithms. In a further embodiment, the data analysis capabilities are incorporated in the controller.

For a preferred embodiment, the sensor apparatus includes an electrically conductive material forming ohmic contacts to the photosensitive material and defining the optically active regions of the device. In a more preferred embodiment, these contacts are further designed to allow the use of standard surface mount technology (SMT) methods for connection with, electrical conductors such as metallization lines and other wiring systems.

Optionally, base 38 may comprise a substantially single structure made of the material that is compatible for exposure to the process conditions in which the optical radiation measurements are to be made. Various methods can be used for fabricating base 38. For a preferred embodiment base 38 comprises an encapsulating layer applied so as to substantially isolate sheet 50, conductors 56, and conductors 58 from the conditions of the process for which the sensor apparatus was designed.

In a preferred embodiment, window 36 can be configured so as to provide optical functions such as optical radiation attenuation, optical radiation wavelength transmission selectivity, and optical radiation reflectivity reduction. Alternatively, window 36 may be configured so as to act as, or support interference filters for the same purpose. Optionally, the optical functions, such as optical radiation attenuation, optical radiation wavelength transmission selectivity, and optical radiation reflectivity reduction, can be achieved by depositing thin optical films onto window 36 for attenuation, transmission selectivity, and reflectivity control. For some embodiments of the present invention, the sensor apparatus also includes a thin film interference filter applied to window 36.

As an option for some embodiments of the present invention, the sensor apparatus includes wavelength specific filters configured to operate with sensors 40 for the embodiment in FIG. 2A or sheet 50 for the embodiment in FIG. 3A so as to provide information that is more specifically related to the distributions of selected chemicals involved in the production of the optical radiation being measured during the process.

In another preferred embodiment, the sensor apparatus also includes a temperature sensor such as a thermistor and/or a blind photosensor that may be used for temperature compensation of the illumination reading. Regarding the blind photosensor, the embodiment includes a photosensor that is not exposed to the optical radiation so as to serve as a reference for the readings obtained for the photosensors that are exposed to the optical radiation. Alternatively, another type of temperature sensor can be incorporated as part of the sensor apparatus.

Reference is now made to FIG. 4A where there is shown a cross-section side view of a sensor apparatus 16 according to one embodiment of the present invention. Sensor apparatus 16 is essentially the same as that shown for the embodiment shown in FIG. 1 and FIG. 2A with the exception that window 36 has a hole for which a controller 48T extends from base 38. Controller 48T is essentially the same as controller 48 with respect to capabilities and functions. It is to be understood that embodiments of the present invention do not all require having the window cover the controller.

Reference is now made to FIG. 4b where there is shown a cross-section side view of a sensor apparatus 16 according to one embodiment of the present invention. Sensor apparatus 16 is essentially the same as that shown for the embodiment shown in FIG. 1 and FIG. 2A with the exception that window 36 has a hole for which a controller 48T extends from base 38. Controller 48T is essentially the same as controller 48 with respect to capabilities and functions. FIG. 4B also shows sensor apparatus 16 having a spacer material 64 distributed so as to fill voids between base 38 and window 36. It is to be understood that embodiments of the present invention do not all require having the window cover the controller.

Figure 5:
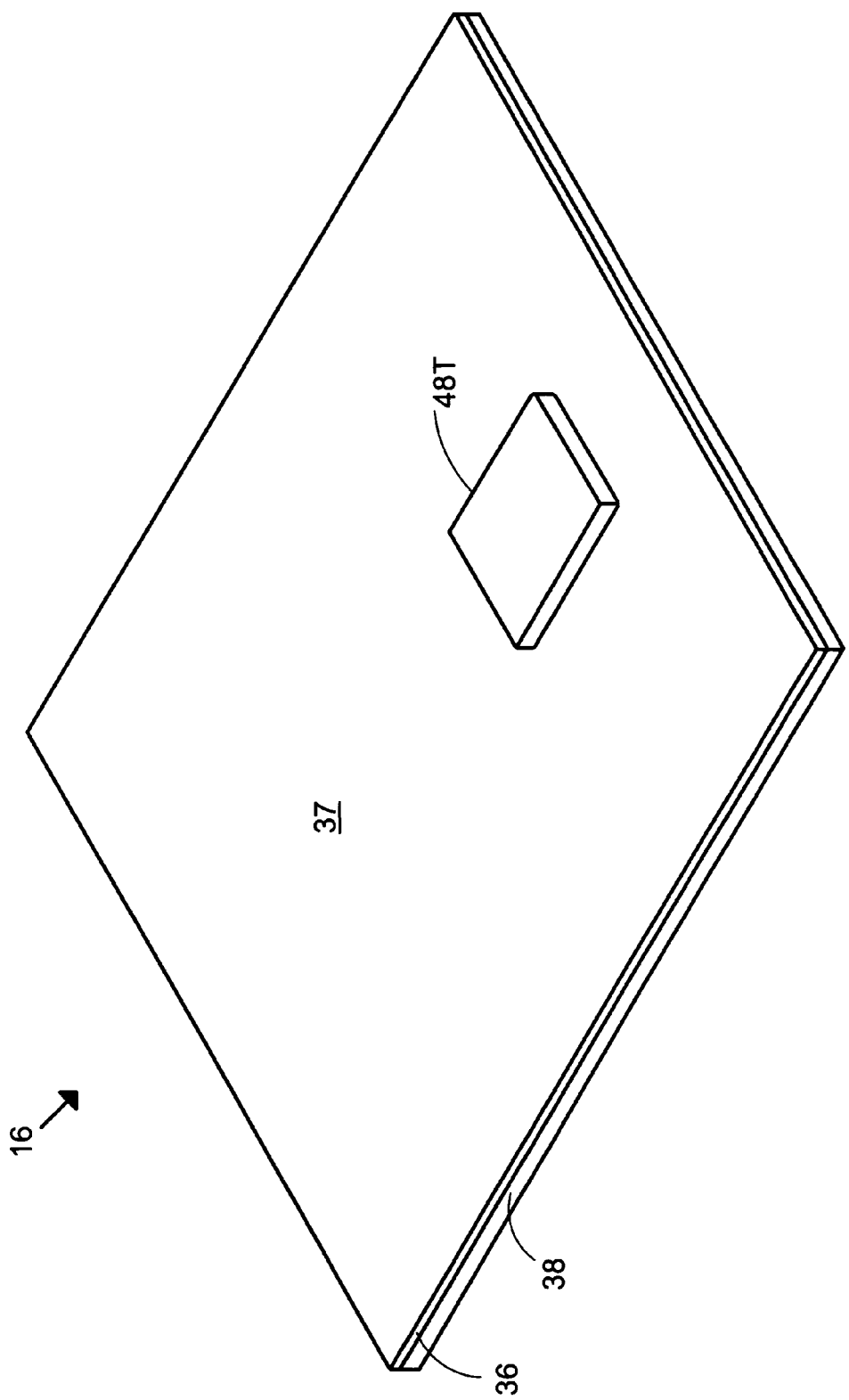
FIG. 5 is a perspective view of an embodiment of the present invention.
Figure 6:
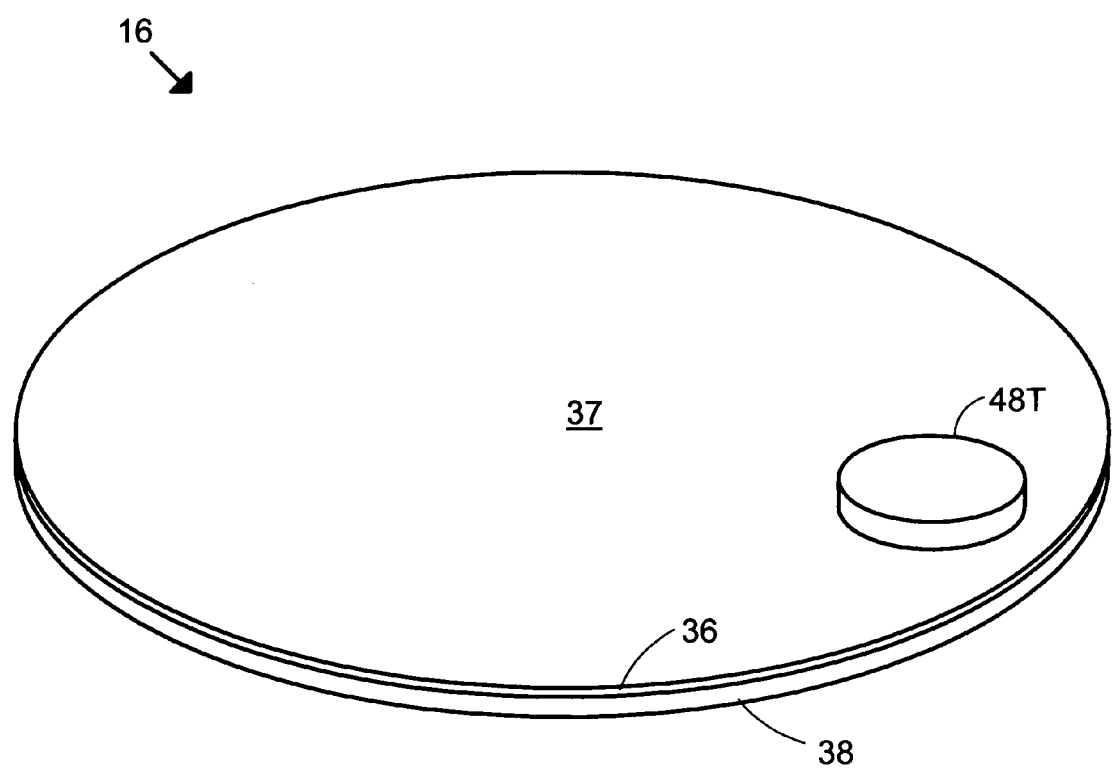
FIG. 6 is a perspective view of an embodiment of the present invention.

Reference is now made to FIG. 5 where there is shown a perspective view of sensor apparatus 16 that was shown in FIG. 4A. FIG. 5 shows sensor apparatus 16 having a rectangular configuration. Optionally, sensor apparatus 16 may have a circular configuration as shown in the perspective view in FIG. 6.

Figure 7:
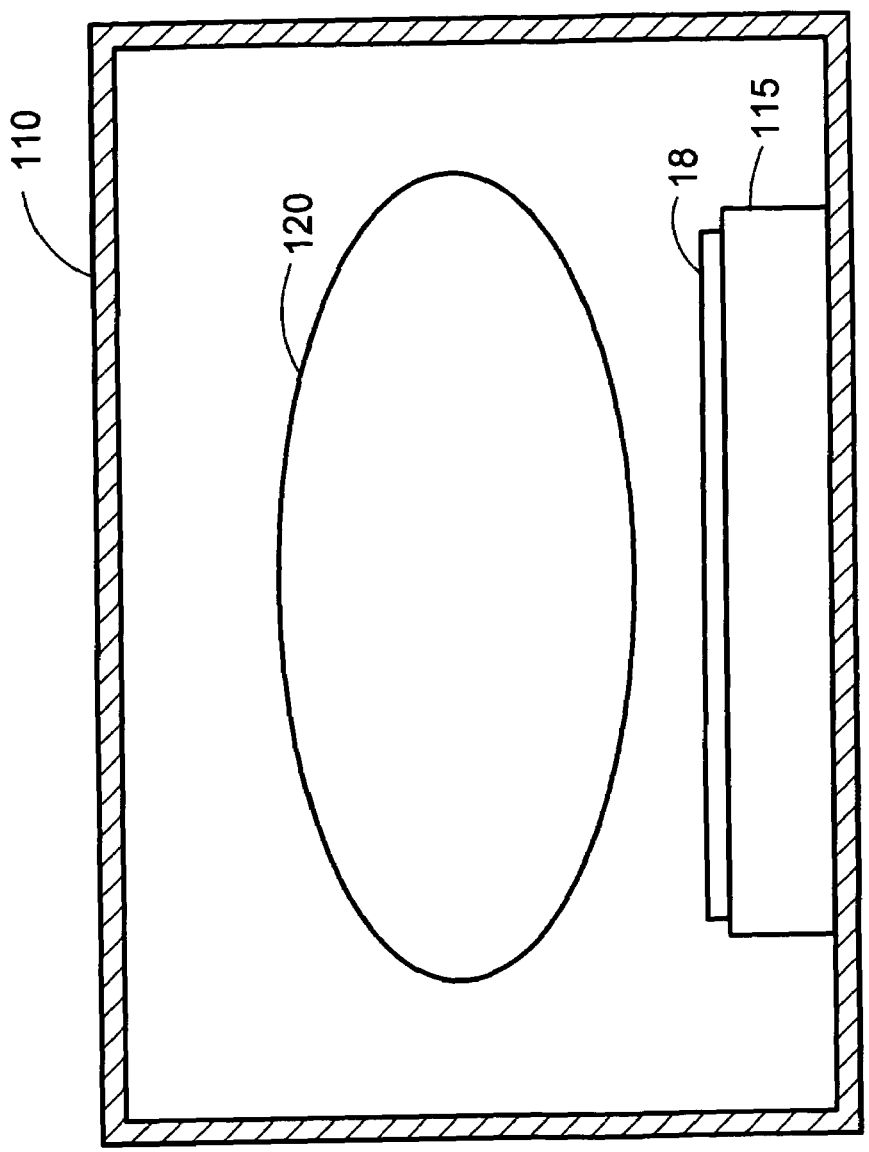
FIG. 7 shows an embodiment of the present invention in use in a plasma processing chamber.

Reference is now made to FIG. 7 where there is shown a sensor apparatus 18, according to one embodiment of the present invention, in use in a plasma chamber 110. Sensor apparatus 18 is essentially the same as either of the embodiments of the present invention described in FIG. 1, FIG. 2A, FIG. 3A, FIG. 4A, FIG. 4B, FIG. 5, and FIG. 6. Sensor apparatus 18 is supported on a workpiece holder 115. Sensor apparatus 18 is exposed to plasma 120 so as to make spatial and/or temporal measurements of optical radiation from plasma 120. Plasma chamber 110 has a robot handler associated with it for loading and unloading workpieces, (robot handler not shown in FIG. 7). For preferred embodiments, sensor apparatus 18 is configured so as to be loaded and unloaded to and from process chamber 110 using the robot handler.

Another embodiment of the present invention includes a method of operating and maintaining a process tool for processing workpieces for which the process involves optical radiation. The method comprises the steps of: Providing a process tool having a robot for transferring a workpiece from a storage container or storage chamber to a workpiece holder. Providing a sensor apparatus configured for measuring one or more of optical radiation, optical radiation trajectory, and optical radiation distribution. The sensor apparatus has dimensions and physical properties that are substantially equal to the dimensions and physical properties of the workpiece. Using the robot to transfer a workpiece from the storage container to the holder for performing the process and unloading the workpiece from the holder back to the storage container or chamber. Using the robot to transfer the sensor apparatus to the holder for performing the process. Using the sensor apparatus to measure the at least one characteristic during the process, and unloading the sensor apparatus from the holder using the robot. In a preferred embodiment, the sensor apparatus is configured for measuring optical radiation distributions or optical radiation trajectories.

The disclosed method and apparatus enables rapid and cost effective assessments of processing conditions within plasma processing environments such as those utilized in the manufacture of products such as integrated circuits and flat panel displays. The ability to directly monitor the plasma state, in conjunction with appropriate system models, allows the plasma process parameters to be adjusted so as to achieve optimal process performance. Optionally, other embodiments of the present invention can be configured for measurements of optical radiation in applications such as deep ultraviolet exposure within a stepper for integrated circuit applications and such as ultraviolet edge exposure for resist bead removal within a photolithography track.

Use of a sensor apparatus such as those described supra configured for data acquisition, data storage, and data communications technology allows accurate, highly resolved measurements to be made on substantially unmodified process systems running typical process recipes. Unlike embodiments of the present invention, the standard technology methods of acquiring similar data require modification of the process chamber and often require alteration of the process conditions. In addition, the use of a sensor apparatus according to embodiments of the present invention that is configured so as to be isolated from a plasma environment by an inert, transparent shield minimizes the possibility of contaminating the processing system.

One embodiment of the present invention includes a method of deploying multiple optically sensitive elements within a plasma-processing environment. An apparatus according to one embodiment of the present invention comprises optically sensitive elements arrayed upon a workpiece-like substrate that can be deployed into the process system utilizing standard robotic loading capabilities of the process system. The measurement of local optical intensity and wavelength distributions can be used to infer the state of the plasma and compare the inferred state based on the measurements to a reference state(s), such as past states of the plasma. Differences between the inferred current state and reference state(s) can be used to adjust plasma parameters so as to optimize the system.

In preferred embodiments of the present invention for plasma-processing applications, the sensor apparatus is configured so as to have a thin form factor. In other words, the sensor apparatus has a thickness that approximates that for the workpiece. The design of the sensor apparatus is done so as to have the sensor apparatus cause minimum perturbation of the plasma process during the measurements. For the most ideal design, this means having a thickness as near as possible to that of the thickness of a silicon wafer, or the thickness of a flat panel display substrate, or the thickness of a lithography mask substrate.

For one embodiment of the present invention, the sensor apparatus comprises a silicon wafer-like disk approximately 5 mm thick containing a plurality of optical radiation sensors and the supporting electronic components for powering, control, and communications electronics. The sensors are configured into a crosspoint network as described supra and the sensors have electrical properties as described supra. The sensor apparatus can be put through a process that involves optical radiation and acquire data related to the temporal and spatial distribution of optical radiation measurements during the process. This data may then be used for a variety of purposes such as process optimization, process monitoring, and fault detection/identification.

Embodiments of the disclosed method and apparatus are configured for processes that involve optical radiation such as processes utilizing a glow discharge for applications such as the fabrication of flat panel displays and such as the surface treatment of materials prior to printing.

It is to be understood that the construction method and the style used to integrate and encapsulate the system components may be further modified to yield a substantially thinner sensor apparatus, perhaps even approximating the thickness of a silicon wafer used for device fabrication. An embodiment of such a sensor apparatus could be accomplished with the incorporation of MEMS integrated cavities and optical radiation sensors combined with hybrid electronic packaging.

Having the benefit of the teachings presented in the foregoing descriptions and the associated drawings, many modifications and other embodiments of the invention will come to mind to one skilled in the art to which this invention pertains. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While there have been described and illustrated specific embodiments of the invention, it will be clear that variations in the details of the embodiments specifically illustrated and described may be made without departing from the true spirit and scope of the invention as defined in the appended claims and their legal equivalents.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A sensor apparatus for measuring optical radiation from within a process chamber, the process chamber being configured for processing workpieces with a process that involves optical radiation, the sensor apparatus comprising:
   a substantially planar window, the window being substantially transparent to the optical radiation;
   at least one sensor for measuring the optical radiation, the at least one sensor having an electrical conductivity response to exposure to the optical radiation, the at least one sensor having a dark resistance of no more than about 2 mega-ohms and a fully illuminated resistance of no less than about 10,000 ohms;

electrical conductors forming electrical connections for the at least one sensor;

a base joined with the window so as to substantially encapsulate the at least one sensor and the electrical conductors therebetween; and a controller electrically connected with the electrical conductors whereby the controller is configured to send and receive electrical signals via the electrical conductors, the controller being supported by the base.

2. The sensor apparatus of claim 1, wherein the window is configured for at least one of: optical radiation attenuation, optical radiation wavelength transmission selectivity, and optical radiation reflectivity reduction.

3. The sensor apparatus of claim 1 further comprising a thin film optical interference filter applied to the window.

4. The sensor apparatus of claim 1 further comprising a filler material provided between the window and the base so as to substantially eliminate one or more voids therebetween.

5. The sensor apparatus of claim 1, wherein the base comprises a silicon wafer.

6. The sensor apparatus of claim 1, wherein the base comprises a flatpanel substrate, or a lithography mask substrate.

7. A sensor apparatus for measuring optical radiation from within a process chamber, the process chamber being configured for processing workpieces with a process that involves optical radiation, the sensor apparatus comprising:

a substantially planar window, the window being substantially transparent;

a substantially planar photosensitive sheet having an electrical conductivity responsive to exposure to optical radiation, the sheet having a dark resistance of no more than about 2 mega-ohms and a fully illuminated resistance of no less than about 10,000 ohms;

electrical conductors applied to the photosensitive sheet so as to form ohmic contacts to the photosensitive sheet, the electrical conductors being arranged so as to define nodes of a crosspoint network of regions of the sheet;

a controller electrically connected with the electrical conductors so as to send and receive electrical signals via the electrical conductors;

a base joined with the window so as to substantially encapsulate the photosensitive sheet and the electrical conductors therebetween; and one or more additional sensors other than optical radiation sensors disposed between the base and the window.

8. The sensor apparatus of claim 7, wherein the window is configured so as to be capable of at least one of:

optical radiation attenuation,
optical radiation wavelength transmission selectivity, and
optical radiation reflectivity reduction.

9. The sensor apparatus of claim 7 further comprising a thin film interference filter applied to the window.

10. The sensor apparatus of claim 7 wherein the one or more additional sensors include a temperature sensor, charge sensor, electric field sensor, magnetic field sensor, heat flux sensor or ion energy sensor disposed between the base and the window.

11. The sensor apparatus of claim 7, wherein the window comprises quartz, fused silica, sapphire, diamond, aluminum oxide, or diamond-like carbon.

12. The sensor apparatus of claim 7, wherein the window is substantially transparent to optical radiation with wavelengths ranging from about 0.2 um to about 0.9 um.

13. The sensor apparatus of claim 7, wherein the photosensitive sheet is responsive to optical radiation with wavelengths ranging from about 0.2 um to about 0.9 um.

14. The sensor apparatus of claim 7, wherein the photosensitive sheet comprises a material selected from the group consisting of cadmium sulfide, cadmium selenide, selenium, germanium, silicon, amorphous silicon, cadmium telluride, and gallium arsenide.

15. The sensor apparatus of claim 7, wherein the workpieces are semiconductor wafers for manufacturing semiconductor devices, the sensor apparatus is substantially circular, and the sensor apparatus has a diameter substantially equal to the diameter of the semiconductor wafers.

16. The sensor apparatus of claim 7, wherein the workpieces are flatpanel display substrates for manufacturing flat panel displays, the sensor apparatus has length and width dimensions substantially equal to the length and width dimensions of the flat panel display substrates.

17. The sensor apparatus of claim 7, wherein the sensor apparatus has length and width dimensions substantially equal to the length and width dimensions of a lithography substrate for manufacturing lithography masks for manufacturing semiconductor devices.

18. The sensor apparatus of claim 7, wherein the photosensitive material has a dark resistance of no more than about 0.5 mega-ohms and a fully illuminated resistance of no less than about 30,000 ohms.

19. The sensor apparatus of claim 7 wherein the electrical conductors comprise a plurality of output electrical conductors and a plurality of input electrical conductors; the controller being connected with the output electrical conductors and with the input electrical conductors, the controller being capable of applying electrical signals to the output electrical conductors, the controller being capable of measuring electrical signals received from the input electrical conductors; whereby, application of electrical signals to the output electrical conductors and measurement of electrical signals at the input electrical conductors provide sufficient information to derive the optical radiation measurements.

20. The sensor apparatus of claim 7 wherein the optical radiation is generated from a plasma process.

21. The sensor apparatus of claim 7 wherein the optical radiation is generated from an ultraviolet light source.

22. An apparatus comprising: a plurality of output electrical conductors; a plurality of input electrical conductors; a plurality of optical radiation sensors capable of presenting optical radiation measurements as electrical resistance, each of the sensors having a dark resistance of no more than about 2 mega-ohms and a fully illuminated resistance of no less than about 10,000 ohms, each of the sensors being connected with one of the output electrical conductors and one of the input electrical conductors so as to form an array of crosspoint connections; and a controller connected with the output electrical conductors and with the input electrical conductors, the controller being configured so as to apply electrical signals to the output electrical conductors, the controller being configured so as to measure electrical signals received from the input electrical conductors so that application of electrical signals to the output electrical conductors and measurement of electrical signals at the input electrical conductors provide sufficient information to derive the optical radiation measurements.

23. The apparatus of claim 22 further comprising a plurality of reference elements having a predetermined and substantially constant electrical resistance, the reference elements being connected with the output electrical conductors and with the input electrical conductors so as to form cross-point connections.

24. The sensor apparatus of claim 22, wherein each of the sensors has a dark resistance of no more than about 0.5 mega-ohms and a fully illuminated resistance of no less than about 30,000 ohms.

25. The sensor apparatus of claim 22 further comprising a thermistor connected with the controller and configured so as to provide a reference correction factor for temperature.

* * * * *